Figure 1:
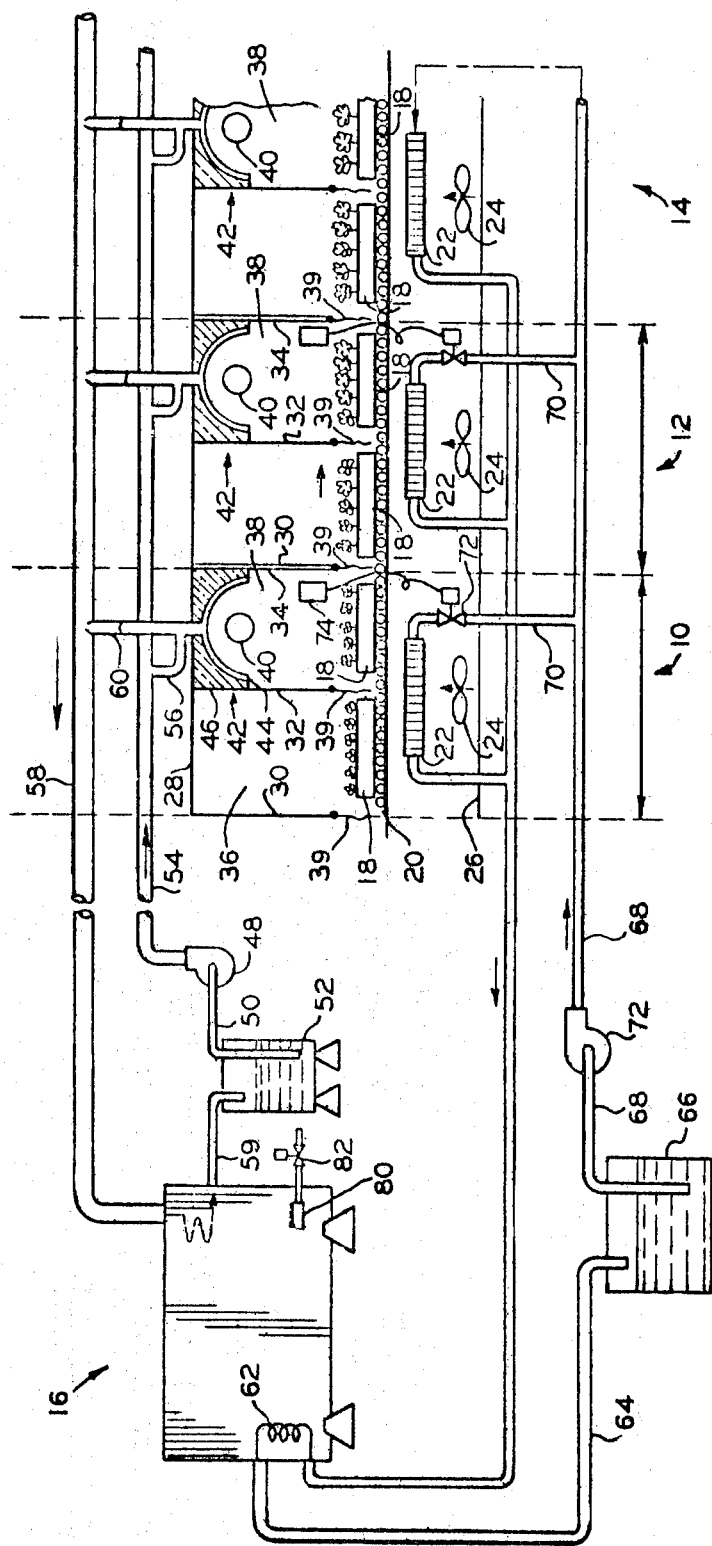

United States Patent [19]
Davis

[11] 3,869,605
[45] Mar. 4, 1975

[54] ENVIRONMENTAL GROWTH CONTROL APPARATUS

[75] Inventor: Noel Davis, Russell, Ohio

[73] Assignee: Integrated Development & Manufacturing Company, Chagrin Falls, Ohio

[22] Filed: June 24, 1970

[21] Appl. No.: 49,218

[52] U.S. Cl.................... 240/47, 240/9 A, 350/290
[51] Int. Cl............................................. F21v 29/00
[58] Field of Search............. 240/47, 9 A, 1 R, 2 R; 350/290

[56] References Cited
UNITED STATES PATENTS

| | | | |
|---|---|---|---|
| 3,409,766 | 11/1968 | Meckler | 240/47 |
| 3,459,934 | 8/1969 | Moore | 240/47 X |
| 3,527,974 | 9/1970 | Cooper | 350/290 X |
| 3,586,851 | 6/1971 | Rudolph | 240/47 |

Primary Examiner—Richard L. Moses
Attorney, Agent, or Firm—Fay & Sharpe

[57] ABSTRACT

The disclosure is directed to a growth chamber apparatus and method of operating the same. The method is concerned with operating a growth chamber of the type having a plurality of electric lamps and at least one cooling coil through which a cooling fluid is circulated to maintain a desired temperature or humidity level within the chamber. The disclosed method comprises the steps of providing an absorption type refrigeration unit and utilizing at least a portion of the cooled process fluid output to supply the cooling fluid for the coil; and, conducting the heat generated by the lamps to the absorption type refrigeration unit to supply at least a portion of the energy required to operate the unit. The disclosed apparatus is particularly arranged for carrying out the noted method.

3 Claims, 3 Drawing Figures

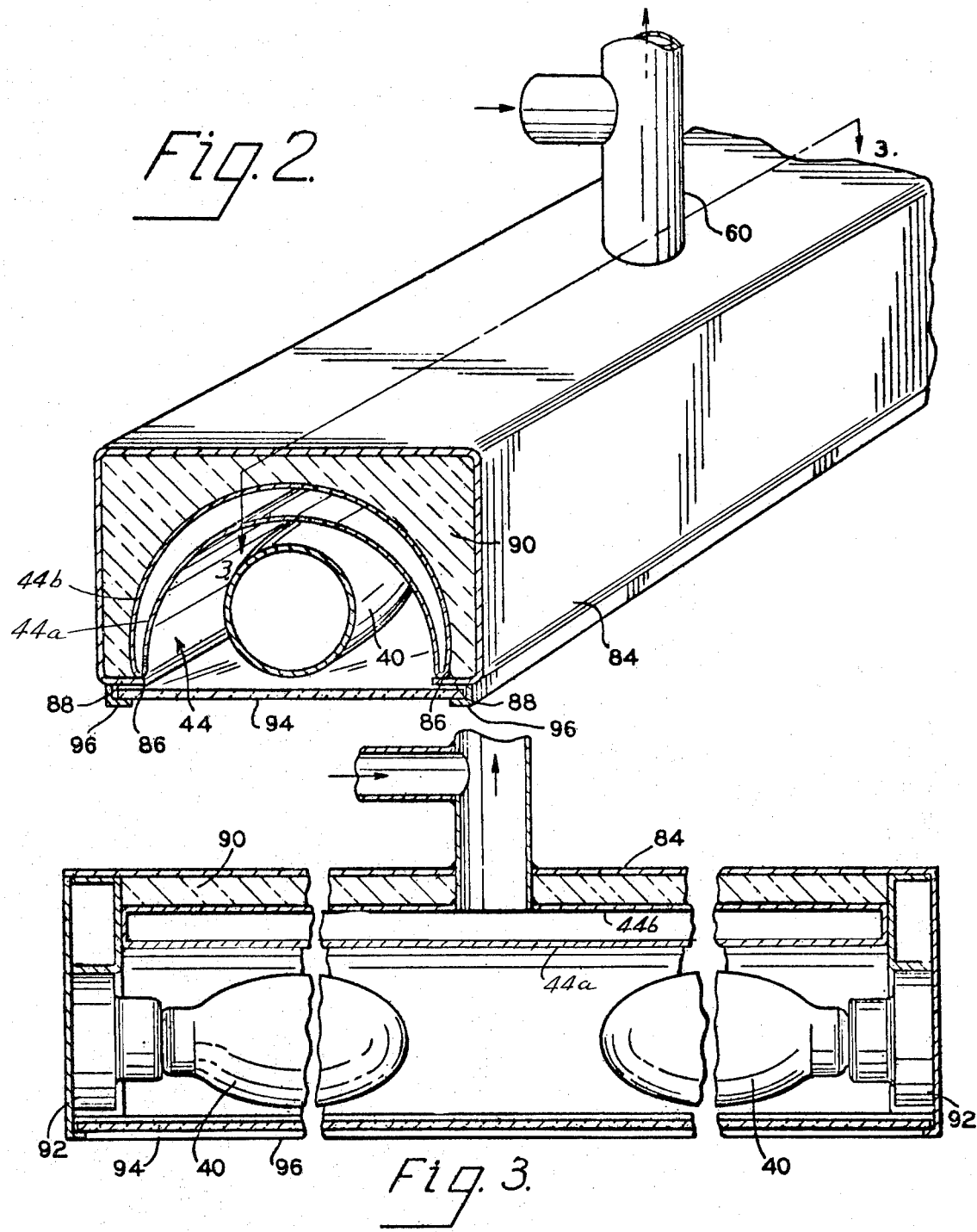

ENVIRONMENTAL GROWTH CONTROL APPARATUS

The subject invention is directed toward the art of environmental growth chambers and, more particularly to an improved method and system for providing closely controlled environmental conditions.

The invention is especially suited for use in large environmental growth chambers on the type used for the commercial production of plants and will be described with particular reference thereto; however, it will be appreciated the invention is capable of broader application and could be used in many such systems without regard to their size or use.

The typical controlled environment chamber for biological testing or the production of plants comprises a well insulated chamber provided with a large number of electric lamps for maintaining high and closely controlled levels of illumination. The chambers also generally include heaters and cooling coils to maintain desired temperature and/or humidity levels.

As can be appreciated, the use of a large number of electric lamps generally results in the generation of a substantial amount of heat. The lamp heat can upset the temperature level within the chamber and, as a consequence, special lamp cooling arrangements have been required. In addition, the chamber cooling equipment must be sized to handle the heat of the lamps, as well as, the normal ambient heat infiltration.

These factors have necessitated the use of relatively large refrigeration units. Although this is not a particular problem in the small growth chambers, in the large chambers or in multi-chamber installations, the increased first cost and operating costs can be substantial. Also, when the chambers are used for the factory production of commercial plant crops, the utilities costs can make the difference between profit and loss.

The subject invention provides an improved method and system for utilizing the heat generated by the lamps to provide all or a substantial portion of the energy required for operating the refrigeration unit. Additionally, the invention permits the lamp cooling equipment previously required to be eliminated or substantially reduced.

In accordance with a first aspect of the invention, there is provided a method of operating a growth chamber of the type include a plurality of electric lamps and having at least one cooling coil through which a cooling fluid is circulated to maintain a desired temperature or humidity level within the chamber. The method comprises the steps of:

a. providing an absorption type refrigeration unit and utilizing at least a portion of the refrigerant output to supply the cooling fluid for the coil; and, b. conducting the heat generated by the lamps to the absorption type refrigeration unit to supply at least a portion of the energy required to operate the unit.

As can be appreciated, the quantity of heat generated by the lamps in the chamber will depend upon the type and number of lamps used. Additionally, the cooling output required from the absorption refrigeration unit will, of course, vary substantially depending, for example, upon the ambient temperature and the temperature being maintained in the chamber. Consequently, althrough in some installations the heat generated by the lamps is sufficient to supply all energy requirements for the refrigeration unit, in many situations, additional energy is required. For this reason, a more limited aspect of the invention contemplates that the method will include the steps of adding additional heat energy to the refrigeration unit to supplement the heat from the lamps.

Another aspect of the invention contemplates the provision of an environmental growth chamber including means defining an enclosed chamber having a plurality of electric lamps for maintaining a high level of illumination therein. The chamber has at least one cooling coil through which cooling fluid is circulated to maintain a desired temperature or humidity level within the chambers. An absorption type refrigeration unit is connected to supply the cooling fluid required by the coil and heat exchange means are associated with the lamps and connected with the refrigeration unit so that heat generated by the lamps is used to supply energy required to operate the refrigeration unit.

Preferably, and in accordance with a more limited aspect of the invention, the heat exchange means comprise reflector members positioned closely adjacent the lamps and defining a closed chamber which is in fluid communication with the refrigeration unit.

In addition to improving of the growth chamber in terms of energy input, the invention also, in many instances, eliminates the need for a separate lamp chamber and lamp cooling equipment. Further, the original equipment cost for the installations formed in accordance with the invention is often less than with prior systems.

Accordingly, the primary object of the subject invention is the provision of an environmental growth chamber which is particularly efficient in operation.

Another object is the provision of a controlled environment growth chamber wherein heat from the lamps is recovered and used to power the refrigeration unit.

A further object is the provision of a lamp reflector which functions to recover heat generated by the lamp.

A still further object is the provision of a growth chamber wherein a major portion of the energy required for operating the refrigeration unit is supplied in the form of waste heat recovered from the lamps.

These and other objects and advantages will become apparent from the following description when read in conjunction with the accompanying drawings wherein FIG. 1 is a schematic diagram showing the invention utilized in a controlled environment factory type system arranged for the continuous production of plants;

FIG. 2 is a pictorial view of the lamp energy traps utilized in the FIG. 1 embodiment; and, FIG. 3 is a longitudinal cross-sectional view taken on line 3—3 of FIG. 2.

Referring more particularly to FIG. 1, there is shown a plant factory which includes a plurality of growth chamber forming modules 10, 12 and 14 each arranged to provide alternate periods of light and dark together with closely controlled environmental conditions or temperature anad humidity. In the embodiment shown, the modules joined together and extend in sideby-side relationship to define an elongated growth corridor through which the plants are moved during their growth cycle. Preferably, there are a number of modules substantially equal to the number of days in the growth cycle of the particular plant being raised. The plants are shown as growing in a plurality of individual trays 18 which are moved through the growth corridor in any convenient manner, such as the roller conveyor 20. Commonly assigned copending U.S. patent No.

3,824,736 entitled "Method and Apparatus for the Factory Production of Plants" describes the preferred method and apparatus for growing plants in this particular type of environment.

Broadly, it is contemplated that the plants will move through the modules so that in each 24 hour period they are subjected to relatively equal, alternate periods of light and dark. While passing through the corridor, the conditions are maintained to provide the most desirable growing environment for the plants. Many types of environment control devices can be used to maintain the desired conditions of temperature and humidity. In the embodiment shown, a refrigeration unit 16 functions to supply cooling fluid to heat exchange coils 22 mounted in each of the modules 10, 12 and 14. Additionally, air is circulated across the coils 22 and through the growth corridor by blowers or fans 24 associated with each of the coils 22. The details of the refrigeration system 16 and its interconnection with the cooling coils will hereafter be described in some detail; however, referring again to the growth modules, it will be seen that they generally include floor defining members 26 having vertically extending walls joined to a ceiling member 28. The opposite ends of the modules are open and sealingly joined to the next adjacent module to define the growth corridor. Additionally, internal partitions 30, 32 and 34 extend between the side walls and downwardly from the roof or ceiling member 22 divide the chambers into a dark section 36 and a light section 38. As can be seen, the internal partitions extend to a point closely above the roller conveyor or the height of the plant in the growth trays 18. Additionally, flexible curtain members or the like 39, are connected to the lower edge of each of the internal partitions and hang downwardly across the corridor to prevent any substantial amount of light from passing from the light chamber portion 38 to the dark chamber portion 36.

Positioned within the light chamber portion 38 are means for providing a high level of illumination therein. The means take the form of electric lamps 40. Although only two lamps 40 are shown in each of the light chambers 38, it is to be appreciated that any desired number can be used as required to produce the desired light level. Additionally, the particular type of lamps utilized can vary widely; however, in the subject embodiment, lamps 40 are high intensity lamps such as the Lucalox or Multi-Vapor lamps sold by the General Electric Company. In any event, it is preferably that the lamps produce a substantial amount of light in the wavelength range of from 400 to 700 nm which is the range most conducive to plant growth. Wavelengths in the ranges above and below the noted range tend to effect the plants adversely or not at all. It is well known, however, that substantially all lamps which have a high output in the noted range also produce a substantial amount of energy in other ranges, particularly the infrared portion. This remaining portion of the light output tends to merely raise the temperature within the growth chamber and produce additional loads on the temperature control equipment. In the past, it has been the practice to remove the lamp heat through special enclosed lamp chambers and lamp air circulating and cooling arrangements.

Because of the above factors, the utilities costs have generally been relatively high and made it difficult to economically produce plants under controlled environment conditions. The subject invention, however, provides an arrangement whereby the utilities costs can be significantly reduced. In the embodiment shown, the means provided include heat trap assemblies 42 associated with each of the lamps 40 and arranged to collect or absorb the heat generated by the lamps. This heat is then used as the energy source for an absorption-type refrigeration unit which produces the cooling fluid required for temperature and/or humidity control within the modules. As shown in FIG. 1, each of the lamps 40 includes a collector or heat trap 42. The collector or heat trap 42 could take a variety of specific forms but a specific preferred form will be described in detail subsequently. For present purposes, however, it is sufficient to note that the heat trap includes means defining a closed fluid chamber 44 which is positioned closely adjacent the associated lamp. Preferably, heat insulation material 46 is positioned about the back side of the closed chamber 44. Additionally, the inner surface of the chamber forming means 44, i.e., the surface which faces the lamps 40 is preferably formed from a material which will reflect light in the wavelength range from 400 to 700 nm while absorbing energy in other wavelengths. For example, porcelain has this selective reflective-absorptive characteristic.

A heat exchange fluid is circulated through chamber 44 and used to collect the heat and conduct it back to the absorption refrigeration unit. Many types of heat exchange fluids could be used either with or without vaporization of the fluid. In the embodiment under consideration, water is used as the fluid. As shown, water is supplied to the chamber forming means 44 by a pump 48 which has its intake 50 connected to a collection tank 52. The outlet of pump 48 is connected through a line 54 with individual lines 56 connected to each chamber 44. Each of the chamber forming means 44 is also connected with a main header 58 by a line 60. During operation of the lamps 40, the heat generated and collected by the traps 42 causes the water supplied to be heated. The heated medium leaves the chambers through line 60 and passes through the header 58 to an indirect heat exchanger in the absorption refrigerant unit 16 where it is used to vaporize the absorption refrigerant such as ammonia or lithium solution of the absorption unit. Thereafter, the cooled heat exchange medium is returned through a line 59 to the collection tank 52.

The details of the absorption refrigeration unit 16 are not of importance to the invention, however it should be noted that the refrigerant output is utilized to supply the required cooling fluid for the heat exchange coils 22. This is preferably accomplished by indirect cooling of a secondary heat exchange fluid such as water or the like. In the embodiment shown, a closed loop circulation system having an indirect cooling coil 62 is connected with the cooling coils 22 through a line 64, a collection tank 66 and lines 68 and 70. A pump 72 is positioned in line 68 to supply the fluid to the heat exchange coils 22. The flow of cooling fluid to the heat exchange coils 22 is preferably controlled in accordance with the needs of the modules. This control could be accomplished in many different ways but, in the embodiment under consideration, each of the lines 70 is provided with a control valve 72 which is actuated by a conventional thermostat sensor 74 positioned in the growing portion of the module.

As can be appreciated, the described system utilizes the lamp heat which was previously removed from the chambers by complicated lamp cooling systems or by added refrigeration system capacity. The use of the lamp heat to provide the required chamber cooling substantially reduces the amount of primary power required to operate the system.

In some installations, the heat available from the lamps will be sufficient to satisfy the total cooling requirements; however, in certain installations including those of a relatively small size or those having high cooling requirements, additional energy may be required for operating the absorption refrigeration system. For this reason, one aspect of the invention contemplates the provision of means for supplying energy to the refrigeration unit. In the embodiment shown, a gas burner 80 is located so as to assist in vaporizing the refrigerant solution when required. Many types of controls could be utilized for operating the gas burner at selected times and in the subject embodiment there is illustrated a gas control valve 82 which can be either manually or automatically operated in accordance with the system needs.

Obviously, many different types of lamp energy traps could be provided. FIGS. 2 and 3 show the preferred form of trap which is relatively simple in its overall arrangement. As shown, the trap includes an outer sheet metal housing 84 having a configuration generally in the shape of an inverted elongated U. Extending throughout the length of the housing 84 is the chamber forming means 44 which is preferably constructed from sheet metal which is formed of first and second walls 44a and 44b having the configuration shown and joined along their edges at 86 to provide a sealed fluid tight chamber. In the embodiment shown, the inner surface 88 is coated with porcelain which will provide selective reflection of light in the wavelength range of 400 to 700 nm. The chamber is connected to the housing by bonding it along its lower edge to the inwardly extending flange portions 88. The entire space within the housing 84 is filled with foam insulation 90 so as to prevent heat loss from the fluid passing through the chamber 44. The pipe 60 is in the fluid communication with the chamber and passes upwardly out of the housing 84.

The lamps 40 are supported within the housing 84 by standard sockets 92 connected to the ends of the housing. The particular type of lamps provided are not important to the invention; however, they are shown as standard high intensity discharge lamps. Additionally, it should be recognized that although two lamps are shown within the chamber, one or several could be utilized depending upon the light level desired.

Although in many instances the cooling effect of the fluid passing through the chamber forming means 44 will be sufficient to prevent the lamp heat from influencing the temperature within the chamber, the subject embodiment provides a barrier member in the form of glass or the like to totally enclose the lamps. Note that a sheet of glass 94 extends completely across the open lower end of the housing and is connected thereto by small flange members 96. Other types of barrier members could be utilized so long as they were transparent to light in the wavelength ranges of from 400 to 700 nm.

The invention has been described in great detail sufficient to enable one of ordinary skill in the art of environmental growth chambers to make and use the same. Obviously, modifications and alterations of the preferred embodiment will occur to others upon a reading and understanding of the specification it is my intention to include all such modifications and alterations as part of may invention insofar as they come within the scope of the appended claims.

What is claimed is:

1. A lamp assembly particularly suited for supplying high intensity illumination to growing plants in an environmental growth chamber comprising:

at least one high intensity electric discharge lamp;

a chamber forming means enclosing said lamp and including a first wall defining a surface extending substantially the length of said lamp, said surface being shaped and coated to reflect in a first direction light produced by said lamp in a wave length range of from approximately 400 to 700 nm, said surface further having the characteristic that light in a wave length range above approximately 700 nm is absorbed;

said chamber forming means further including a second wall defining with said first wall a closed fluid tight chamber, said closed chamber located directly behind said surface in relation to said lamp;

means for circulating a heat exchange fluid through said chamber;

heat insulation means surrounding said chamber on the said opposite said lamp;

a housing enclosing said chamber forming means and said heat insulation means, said housing being open along one side corresponding to the direction in which light is reflected by said surface; and, a barrier member connected across the open side of said housing and enclosing said lamp, said barrier member being formed from material which is transparent to at least light in the wave lengths reflected by said surface.

2. The lamp energy trap as defined in claim 1, wherein said first wall is formed of sheet metal and said surface is defined by a coating on said metal.

3. The lamp energy trap as defined in claim 2 wherein said coating comprises porcelain.

* * * * *